United States Patent
Lim

(10) Patent No.: US 10,652,511 B2
(45) Date of Patent: May 12, 2020

(54) PROJECTOR AND OPERATING METHOD THEREOF

(71) Applicant: LG ELECTRONICS INC., Seoul (KR)

(72) Inventor: Jihwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/107,360

(22) Filed: Aug. 21, 2018

(65) Prior Publication Data

US 2019/0141304 A1 May 9, 2019

(30) Foreign Application Priority Data

Nov. 8, 2017 (KR) ........................ 10-2017-0148087

(51) Int. Cl.
*H04N 9/31* (2006.01)

(52) U.S. Cl.
CPC ........... *H04N 9/3188* (2013.01); *H04N 9/312* (2013.01); *H04N 9/3141* (2013.01)

(58) Field of Classification Search
CPC ......... H04N 9/3188; H04N 9/31–3197; G11B 7/09–0956; G03B 21/00–64
See application file for complete search history.

(56) References Cited

U.S. PATENT DOCUMENTS

| | | | |
|---|---|---|---|
| 9,838,655 B2 | 12/2017 | Kato | |
| 2005/0128438 A1* | 6/2005 | Kang | H04N 9/3141 353/69 |
| 2005/0140934 A1 | 6/2005 | Seo et al. | |
| 2011/0234650 A1* | 9/2011 | Watanabe | G09G 3/003 345/690 |
| 2014/0293247 A1* | 10/2014 | Abe | G03B 21/142 353/101 |
| 2016/0316182 A1 | 10/2016 | Kato | |
| 2017/0099484 A1* | 4/2017 | Mashitani | H04N 13/341 |
| 2018/0246336 A1 | 8/2018 | Greenberg | |
| 2019/0113683 A1* | 4/2019 | Tokutaka | G02B 6/272 |

FOREIGN PATENT DOCUMENTS

| | | |
|---|---|---|
| JP | 2003172900 | 6/2003 |
| JP | 2007522489 | 8/2007 |
| KR | 100814643 | 3/2008 |
| WO | 2017037708 | 3/2017 |

OTHER PUBLICATIONS

PCT International Application No. PCT/KR2018/012406, International Search Report dated Jan. 22, 2019, 3 pages.

* cited by examiner

*Primary Examiner* — Cara E Rakowski
*Assistant Examiner* — Christopher A Lamb, II
(74) *Attorney, Agent, or Firm* — Lee, Hong, Degerman, Kang & Waimey

(57) ABSTRACT

A projector includes a light source configured to provide light, a digital micromirror device configured to form a video by selectively reflecting the light, a projection lens configured to enlarge and project the light reflected by the digital micromirror device onto a screen, and the actuator assembly disposed between the digital micromirror device and the projection lens and configured to allow the light incident on the projection lens from the digital micromirror device to travel straight or be refracted. The actuator assembly includes a first actuator including a first glass, and a second actuator including a second glass.

14 Claims, 13 Drawing Sheets

FIG. 14
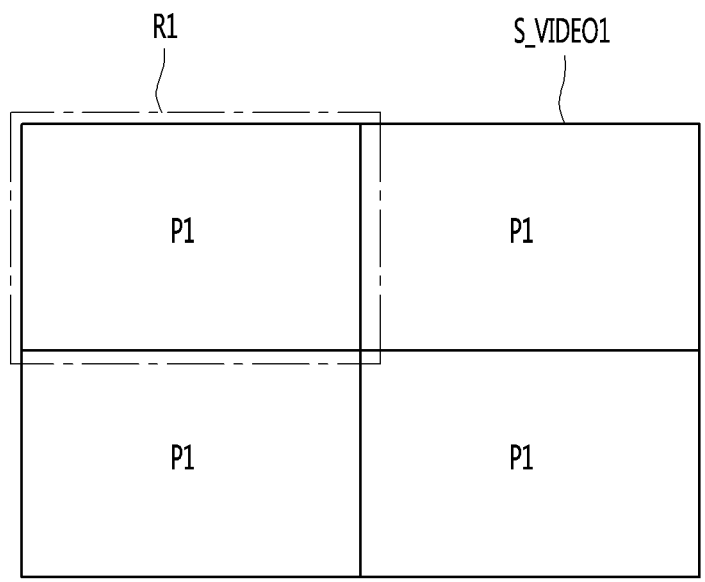
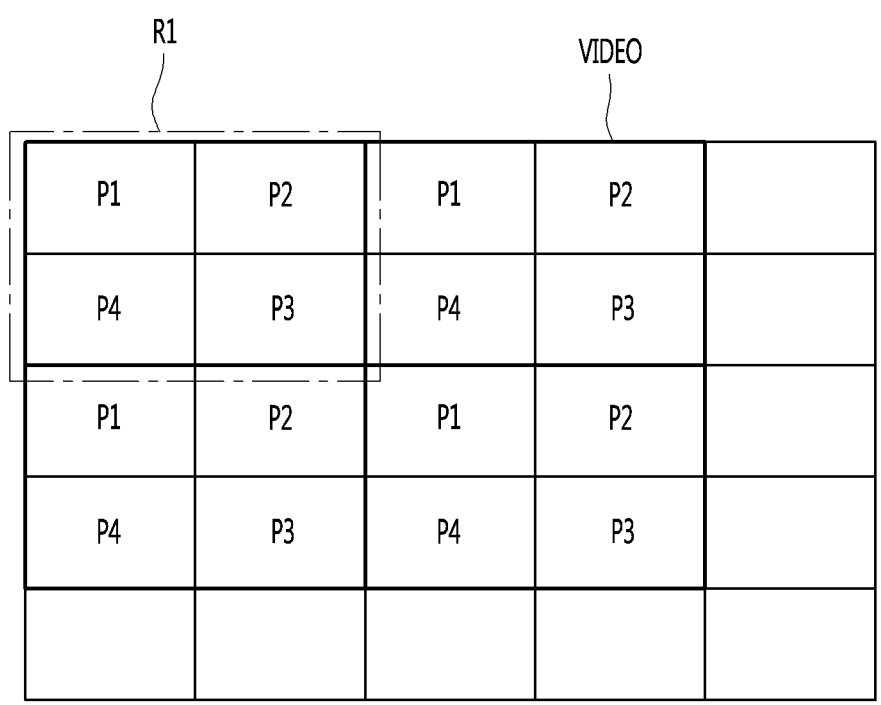

PROJECTOR AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2017-0148087, filed on Nov. 8, 2017, the contents of which are all hereby incorporated by reference herein in its entirety.

BACKGROUND

The present disclosure relates to a projector, and more particularly, to a projector capable of projecting a video or content having high resolution such as UHD resolution, and an operating method thereof.

A projector or a beam projector of display devices is a device that projects a video. Since the projector projects light onto a screen to implement a video, the projector may easily implement a large screen, as compared to other display devices.

Recently, as overall performance such as resolution and brightness of the projector has been improved and the projector has been miniaturized, a service environment of the projector, which has been limited to a company, a school, or the like in the past, is expanding to home or the outdoors.

As the service environment of the projector is diversified as described above, types of content projected using the projector are also diversified, and a demand for a projector supporting higher resolution tends to be increased according to types of content.

With this trend, recently, projectors supporting UHD resolution of 3840×2160 (or 4K resolution) have appeared. However, when an expensive chipset or a digital micromirror device (DMD) supporting UHD resolution is used in projectors, unit costs of products may be excessively increased. Thus, it is difficult to generalize projectors supporting UHD resolution.

SUMMARY

Embodiments provide a projector capable of stably providing high resolution content by using a digital micromirror device having low resolution and an actuator assembly capable of refracting light to be projected.

Embodiments also implement a projector having a compact size and proving high resolution content.

In one embodiment, a projector includes: a light source configured to provide light; a digital micromirror device configured to form a video by selectively reflecting the light; a projection lens configured to enlarge and project the light reflected by the digital micromirror device onto a screen; and the actuator assembly disposed between the digital micromirror device and the projection lens and configured to allow the light incident on the projection lens from the digital micromirror device to travel straight or be refracted, wherein the actuator assembly includes a first actuator including a first glass, and a second actuator including a second glass.

The first glass may be tilted in a first direction, and the second glass may be tilted in a second direction perpendicular to the first direction.

The first actuator may include a first frame disposed outside the first glass and fixed in a housing of the projector; a first rotational shaft extending from the first glass in the second direction, connected to the first frame, and fixing the first glass to the first frame such that the first glass is tilted; and a first tilt driver tilting the first glass in the first direction.

The second actuator may include a second frame disposed outside the second glass and fixed in the housing of the projector; a second rotational shaft extending from the second glass in the first direction, connected to the second frame, and fixing the second glass to the second frame such that the second glass is tilted; and a second tilt driver tilting the second glass in the second direction.

The first frame and the second frame may have the same size.

The first frame and the second frame may be coupled such that one surface of the first glass and one surface of the second glass face each other.

The first glass and the second glass may be spaced apart from each other so as not to contact each other when at least one of the first glass and the second glass is tilted.

The first tilt driver may include a first coil fixed to the first frame and a first magnetic body fixed to the first glass, and the second tilt driver may include a second coil fixed to the second frame and a second magnetic body fixed to the second glass.

The projector may further include a subframe generator configured to generate a plurality of subframe videos from a video input to the projector based on first resolution of the video and second resolution of the digital micromirror device, and a subframe projection controller configured to control the digital micromirror device to sequentially project the plurality of subframe videos and control the first tilt driver and the second tilt driver such that the plurality of subframe videos are projected at different optical angles.

The subframe generator may divide each frame of the video into a plurality of subframes based on a ratio between the first resolution and the second resolution, and generate the plurality of subframe videos including the plurality of subframes, wherein resolution of each of the plurality of subframe videos is the second resolution.

A total frame rate of the plurality of subframe videos may be the product of a frame rate of the input video and the number of the plurality of subframe videos.

The projector may further include a memory configured to store the plurality of subframe videos.

In another embodiment, an operating method of a projector includes: generating a plurality of subframe videos from an input video; controlling a digital micromirror device of the projector to sequentially projecting frames of the plurality of subframe videos; and controlling an actuator assembly of the projector to project the plurality of subframe videos at different optical angles, wherein the actuator assembly includes a first glass tilted in a first direction and a second glass tilted in a second direction perpendicular to the first direction, and the controlling of the actuator assembly includes controlling the first glass and the second glass such that at least one of the first glass and the second glass is tilted or is not tilted when each of the plurality of subframe videos is projected.

BRIEF DESCRIPTION OF THE DRAWINGS

FIG. 14 is a view illustrating videos displayed according to results of the video projecting operations according to the embodiments shown in FIGS. 10 to 13.

DETAILED DESCRIPTION OF THE EMBODIMENTS

Hereinafter, embodiments related to the present disclosure will be described in more detail with reference to the accompanying drawings. A suffix "module," "unit," or "portion" of an element used herein is assigned or incorporated for convenience of specification description, and the suffix itself does not have a distinguished meaning or function.

Figure 1:
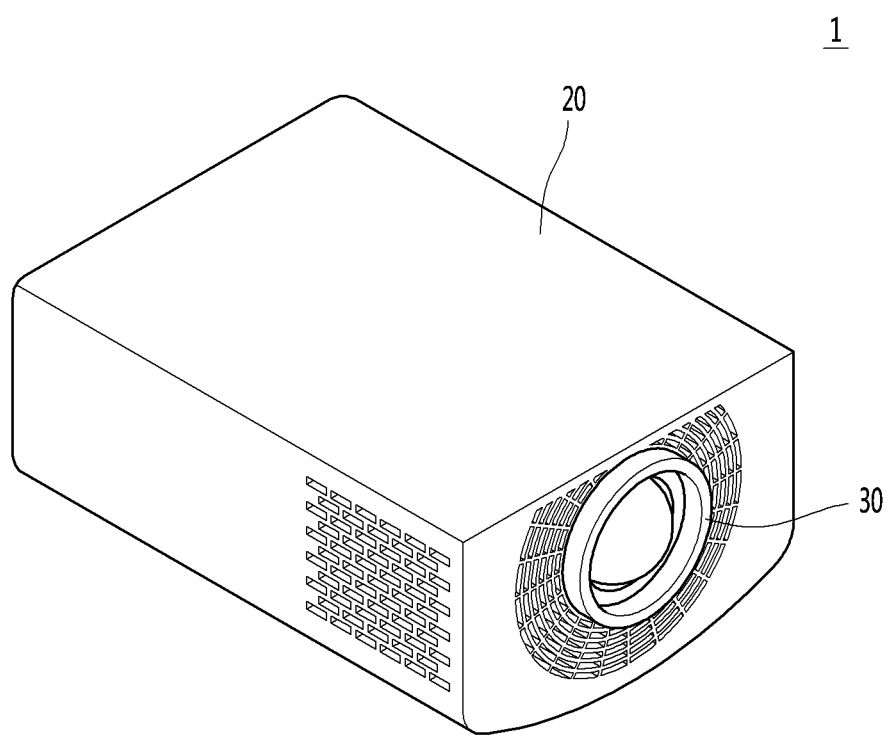
FIG. 1 is a perspective view illustrating a projector according to an embodiment of the present disclosure.
Figure 2:
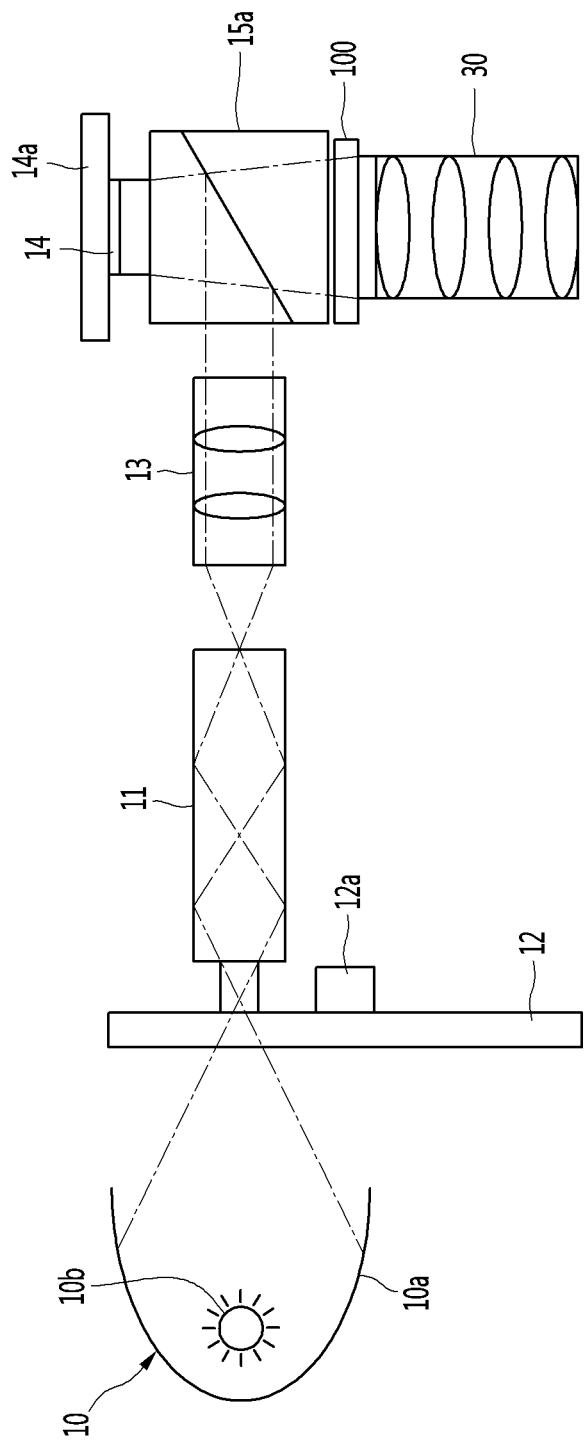
FIG. 2 is a block diagram illustrating an optical engine included in a projector, according to an embodiment of the present disclosure.

FIG. 1 is a perspective view illustrating a projector 1 according to an embodiment of the present disclosure. FIG. 2 is a block diagram illustrating an optical engine included in the projector 1, according to an embodiment of the present disclosure.

Referring to FIG. 1, the projector 1 according to the embodiment of the disclosure may include a housing 20 constituting an external appearance of the projector 1 and a projection lens 30 disposed on one side of the housing 20. The optical engine may be accommodated in the housing 20. The projector 1 described in the present specification may be implemented as a digital light processing (DLP) projector, but is not necessarily limited thereto.

Figure 3:
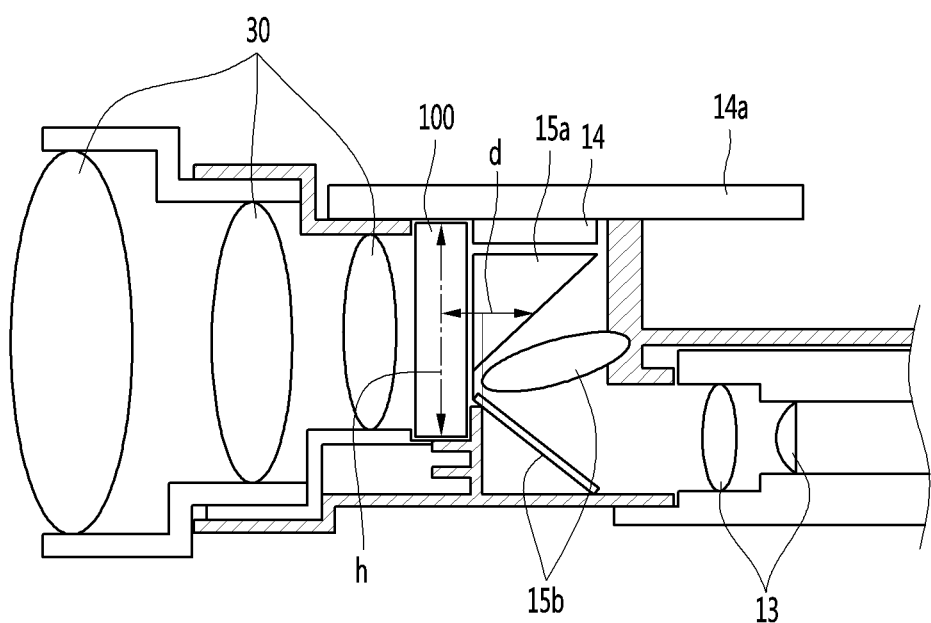
FIG. 3 is a cross-sectional view illustrating an optical engine of a projector, according to an embodiment of the present disclosure.

Referring to FIGS. 2 and 3, the optical engine according to the embodiment of the present disclosure may include a light source 10, a light tunnel 11, a color wheel 12, a condensing lens 13, a digital micromirror device (DMD) 14, a prism 15a, an actuator assembly 100, and the projection lens 30.

The DMD 14 may form a video by selectively reflecting light provided from the light source 10. Each of a plurality of micromirrors included in the DMD 14 may reflect light in an on state in the direction of a screen or reflect light in an off state in the direction in which there is no screen, according to a video signal supplied from the outside.

The light source 10 may include a reflector 10a and a lamp 10b. The lamp 10b has a configuration providing light (for example, white light). The lamp 10b may be implemented using a light-emitting diode (LED), but is not limited thereto. The reflector 10a may have a certain curvature to condense light provided from the lamp 10b. Light condensed by the reflector 10a may pass through the color wheel 12 to be spilt into red light, green light, and blue light.

The color wheel 12 may be driven a wheel rotational shaft 12a. The color wheel 12 may be driven by a motor, and R, G, and B filters may be attached to the color wheel 12. For example, the R, G and B filters may be attached to the color wheel 12 in three equal parts of 360 degrees, and thus, the color wheel 12 may transmit any one color according to a rotation angle of the wheel rotational shaft 12a. According to embodiments, two R filters, two G filters, and two B filters may be attached in six equal parts of 360 degrees to reduce the rotation angle of the wheel rotational shaft 12a for transmitting any one color, thereby reducing power consumption of the wheel rotational shaft 12a when the motor is driven.

The light tunnel 11 may have a pipe shape (for example, a square pipe shape). A mirror may be disposed on an inner wall of the light tunnel 11 to totally reflect light passing through the color wheel 12. The light passing through the color wheel 12 may be totally reflected to uniformly spread while passing through the light tunnel 11. As a result, the light passing through the light tunnel 11 may become uniform surface light.

The light passing through the light tunnel 11 may be re-condensed while passing through the condensing lens 13 and may be reflected by the prism 15a to travel toward the DMD 14. The prism 15a may totally reflect or transmit light according to an angle of incidence of the light. A shown in FIG. 3, light passing through the condensing lens 13 may be reflected by the reflection mirror 15b and then may pass through the prism 15a to travel toward the DMD 14.

Light incident on the DMD 14 may travel toward a screen or deviate from the screen according to an on/off state of a micrometer controlled by a sampled pixel value. For example, the DMD 14 may be a DMD supporting FHD resolution of 1920×1080, but is not necessarily limited thereto. Light reflected by the DMD 14 may be totally reflected by the prism 15a and be incident on the projection lens 30. Light passing through the projection lens 30 may be projected onto a screen in the front of the projector 1 to display specific content on the screen.

The projection lens 30 may include a plurality of projection lenses. Light reflected toward the screen by the DMD 14 and the prism 15a may be incident on the projection lens 30. The light incident on the projection lens 30 may pass through the plurality of projection lenses and then may be enlarged and projected onto the screen.

Meanwhile, the optical engine of the projector 1 according to embodiments of the present disclosure may further include the actuator assembly 100 disposed between the DMD 14 and the projection lens 30. The actuator assembly 100 may refract the light reflected toward the screen by the DMD 14. For example, when the projector 1 includes the DMD 14 and other chipsets, supporting FHD resolution, light reflected by the DMD 14 and the prism 15a may pass through the projection lens 30, and thus content projected onto the screen may have FHD resolution. The actuator assembly 100 according to embodiments of the present disclosure may operate to project content having four times resolution, i.e., UHD resolution onto the screen by allowing the light reflected toward the screen by the DMD 14 supporting FHD resolution to travel straight or be refracted such that the light travels through four paths.

Hereinafter, the actuator assembly 100 according to embodiments of the present disclosure will be described in more detail with reference to FIGS. 3 to 8.

Figure 4:
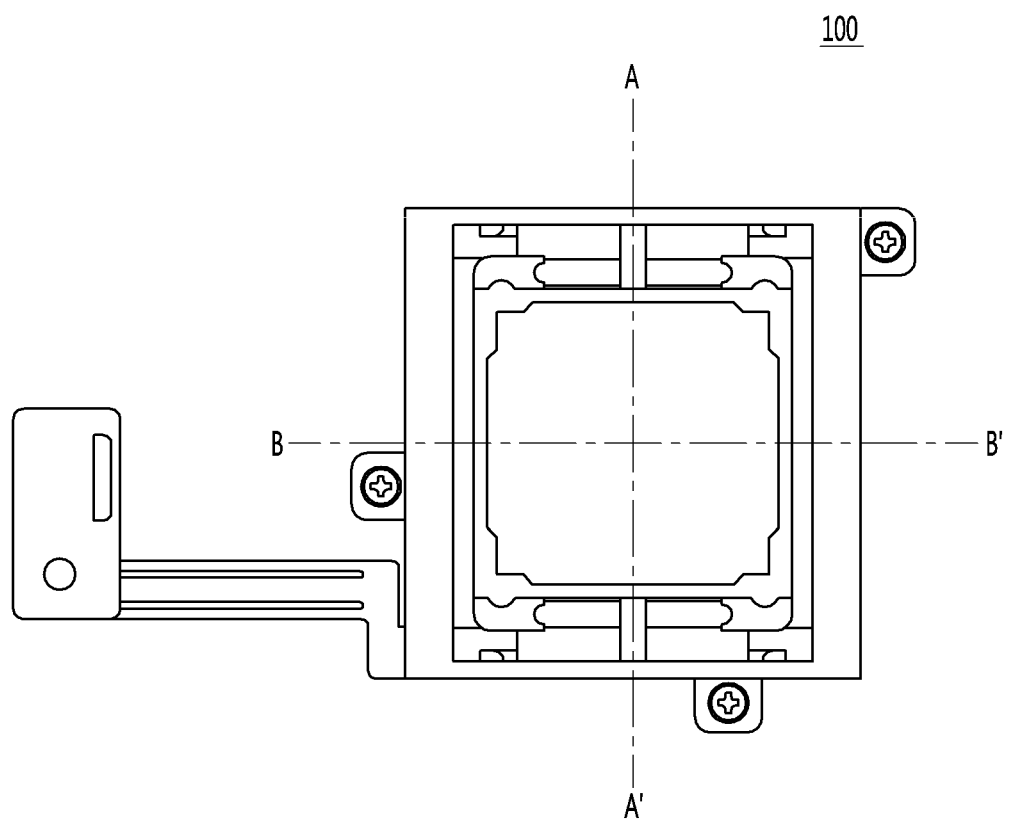
FIG. 4 is a cross-sectional view illustrating an actuator assembly included in a projector, according to embodiments of the present disclosure.
Figure 5:
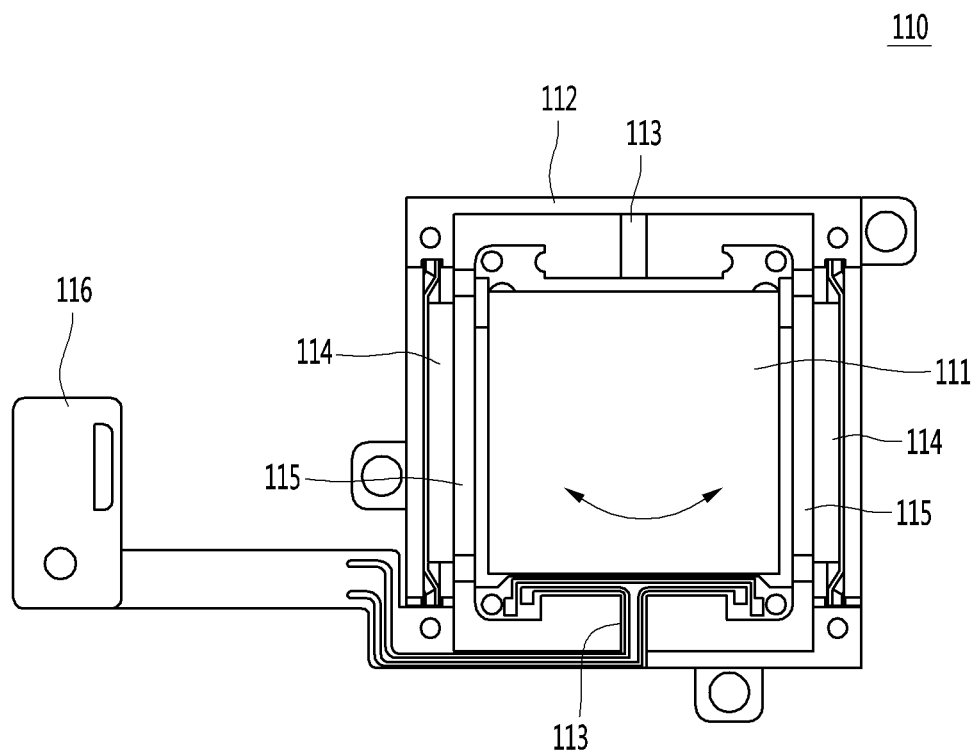
FIGS. 5 and 6 are views respectively illustrating a first actuator and a second actuator included in the actuator assembly.
Figure 6:
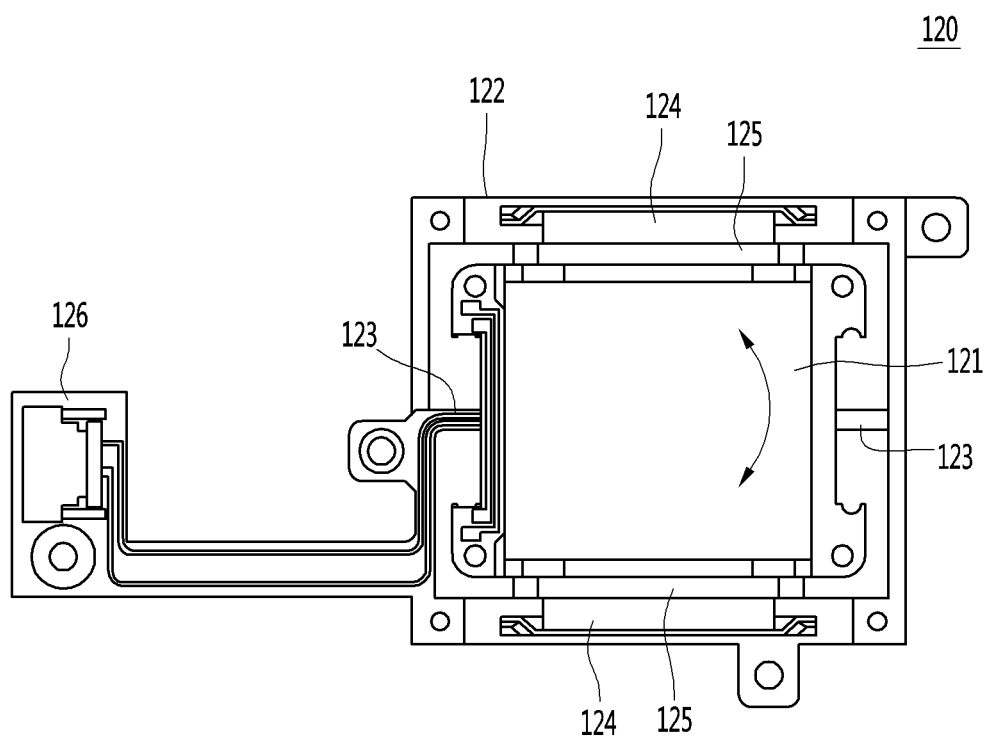
Figure 7:
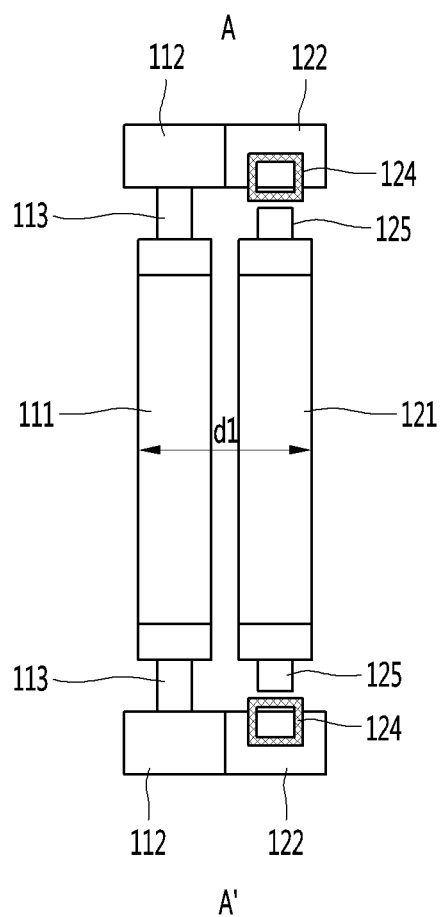
FIG. 7 is a cross-sectional view taken along line A-A' of the actuator assembly shown in FIG. 4.
Figure 8:
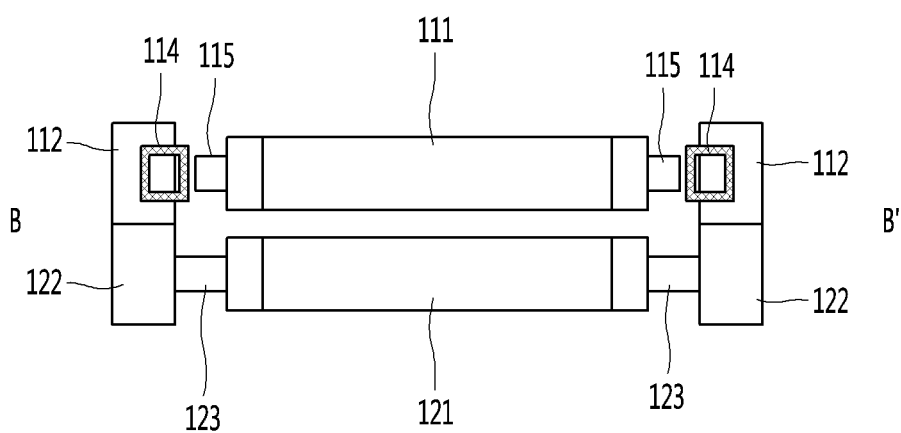
FIG. 8 is a cross-sectional view taken along line B-B' of the actuator assembly shown in FIG. 4.

FIG. 3 is a cross-sectional view illustrating the optical engine of the projector 1, according to the embodiment of the present disclosure, and FIG. 4 is a cross-sectional view illustrating the actuator assembly 100 included in the projector 1, according to embodiments of the present disclosure. FIGS. 5 and 6 are views respectively illustrating a first actuator 110 and a second actuator 120 included in the actuator assembly 100. FIG. 7 is a cross-sectional view taken along line A-A' of the actuator assembly 100 shown in FIG. 4. FIG. 8 is a cross-sectional view taken along line B-B' of the actuator assembly 100 shown in FIG. 4.

Referring to FIG. 3, the actuator assembly 100 may be disposed below a driving board 14a including a chipset for driving the optical engine. The actuator assembly 100 may allow the light reflected toward the projection lens 30 by the DMD 14 and the prism 15 to travel straight or be refracted at a certain angle. To this end, the actuator assembly 100 may include glasses and tilt drivers for tilting the glasses.

As described with reference with FIG. 2, in order for the actuator assembly 100 to allow the light reflected toward the screen by the DMD 14 to travel straight or be refracted such that the light travels through four paths, glasses may be tilted in a first direction (for example, a horizontal direction) and a second direction (for example, a longitudinal direction) perpendicular to the first direction, respectively. When the actuator assembly 100 includes one glass, a first tilt driver tilting the glass in the first direction, and a second tilt driver tilting the glass in the second direction, an overall size of the actuator assembly 100 may be increased.

When the overall size of the actuator assembly 100 is increased, a height h of the actuator assembly 100 may also be increased. Therefore, a size of the projection lens 30 disposed in the front of the actuator assembly 100 is also increased, and thus, overall sizes of the optical engine and the projector 1 may also be increased.

According to embodiments, as the height h of the actuator assembly 100 is increased, the actuator assembly 100 may not be disposed below the driving board 14a. In this case, it is necessary to dispose the actuator assembly 100 in the front (the placement direction of the projection lens 30 in FIG. 3) of the driving board 14a. Accordingly, a distance d between the prism 15a and the actuator assembly 100 may be increased. When the distance d between the prism 15a and the actuator assembly 100 is increased, a glass size of the actuator assembly 100 and a size of the projection lens 30 may also be increased. Thus, sizes of the optical engine and the projector 1 including the optical lens are subject to be increased.

The increase in the size of the projector 1 may cause a decrease in product competitiveness of a product group, such as a portable projector or a home projector, requiring product miniaturization.

In addition, when the actuator assembly 100 is implemented such that one glass is tilted in both of the first direction and the second direction, the glass may be minutely tilted in one direction due to a vibration or the like while being tilted in other direction. Thus, the glass may not be tilted at an accurate angle. As described above, when the tilted angle of the glass is inaccurate, image quality of a projected screen may be lowered or screen failure may be generated.

Hereinafter, the actuator assembly 100 according to the present disclosure, in order to solve the above problems, will be described in detail.

Referring to FIGS. 4 to 8, the actuator assembly 100 according to embodiments of the present disclosure may include the first actuator 110 and the second actuator 120. The first actuator 110 and the second actuator 120 may be coupled such that one surface of a first glass 111 and one surface of a second glass 121 face each other. In the present specification, the first actuator 110 and the second actuator 120 are illustrated as being respectively disposed in the front and the rear of the actuator assembly 100, but the first actuator 110 and the second actuator 120 may be respectively disposed in the rear and the front of the actuator assembly 100.

The first actuator 110 may include the first glass 111, a first frame 112 formed outside the first glass 111, a first rotational shaft 113, a first tilt driver (first coil 114 and first magnetic body 115), and a circuit connector 116. The second actuator 120 may include the second glass 121, a second frame 122 formed outside the second glass 121, a second rotational shaft 123, a second tilt driver (second coil 124 and second magnetic body 125), and a circuit connector 126.

The first glass 111 and the second glass 121 may transmit the light reflected by the DMD and the prism 115a toward the projection lens 30. For example, the first glass 111 and the second glass 121 may have tetragonal shapes having the same size and may be implemented using glass, transparent plastic, or the like.

The first glass 111 may be fixed to the first frame 112 through the first rotational shaft 113 so as to be tilted, and the second glass 121 may be fixed to the second frame 122 through the second rotational shaft 123 so as to be tilted. As shown in FIGS. 5 and 6, the first rotational shaft 113 may extend in the second direction (for example, the longitudinal direction) from the first glass 111 to be connected to the first frame 112, and thus, the first glass 111 may be tilted in the first direction (for example, the horizontal direction). Meanwhile, the second rotational shaft 123 may extend in the first direction from the second glass 121 to be connected to the second frame 122, and thus, the second glass may be tilted in the second direction. That is, the actuator assembly 100 according to embodiments of the present disclosure may include two glasses respectively tilted in different directions, thereby more accurately adjusting a tilted angle.

The first tilt driver (first coil 114 and first magnetic body 115) may tilt the first glass 111 in the first direction according to control of a subframe projection controller 920 to be described later with reference to FIG. 9. The first tilt driver (first coil 114 and first magnetic body 115) may be formed on each of both sides of the first glass 111 in the first direction.

The first tilt driver (first coil 114 and first magnetic body 115) may include the first coil 114 through which a current flows according to control of the subframe projection controller 920, and the first magnetic body 115 moved based on a magnetic field formed by the current flowing through the first coil 114. The first coil 114 may be fixed to the first frame 112, and the first magnetic body 115 may be fixed to the first glass 111. Since the first frame 112 is fixed in the housing 20 of the projector 1, in a case where a current flows through the first coil 114, only the first magnetic body 115 and the first glass 111 may be tilted, and the first coil 114 may not be moved.

In an example, in a case where a current flows through the first coil 114, the first magnetic body 115 may be moved by the magnetic field, and thus, the first glass 111 may be tilted at a certain angle in the first direction. In a case where a current does not flow through the first coil 114, the first glass 111 may return to a reference position. In embodiments of the present disclosure, the first glass 111 may be implemented so as to be tilted at an angle of about 0.3° in the first direction, but a tilted angle of the first glass 111 is not limited to the angle of about 0.3°.

Similarly, the second tilt driver (second coil 124 and second magnetic body 125) may tilt the second glass 121 in the second direction according to control of the subframe projection controller 920. The second tilt driver (second coil 124 and second magnetic body 125) may be formed on each of both sides of the second glass 121 in the second direction. The second tilt driver (second coil 124 and second magnetic body 125) may include the second coil 124 which is fixed to the second frame 122 and through which a current flows, and the second magnetic body 125 which is connected to the second glass 121 and tilts the second glass 121 in the second direction based on a magnetic field formed by the current flowing through the second coil 124. Since the second frame 122 is fixed in the housing 20 of the projector 1, in a case where a current flows through the second coil 124, only the second magnetic body 125 and the second glass 121 may be tilted, and the second coil 124 may not be moved. Similar to the first glass 111, the second glass 121 may be implemented so as to be tilted at an angle of about 0.3° in the second direction, but a tilted angle of the second glass 121 is not limited to the angle of about 0.3°.

As shown in FIG. 7, in order to prevent the damage or the breakage due to a contact between the first glass 111 and the second glass 121 when the first glass 111 and the second glass 121 are tilted, the first glass 111 and the second glass 121 may be spaced apart from each other by a certain distance. In this case, the first glass 111 and the second glass 121 may be spaced apart from each other by a distance greater than or equal to a distance dl for preventing a contact between the first glass 111 and the second glass 121 when at least one of the first glass 111 and the second glass 121 is tilted.

According to embodiments, the distance dl may be a distance capable of preventing an electromagnetic effect between the first glass 111 and the second glass 121. For example, when a current flows though the first coil 114, the distance dl may be a separation distance in which an induced current is not generated in the second coil 124, or a separation distance in which a magnetic force is not applied between the first glass 111 and the second glass 121.

The circuit connectors 116 and 126 may be connected with the driving board 14a or a power supply (not shown) so as to supply a current to the first tilt driver (in particular, the first coil 114) and the second tilt driver (in particular, the second coil 124).

The first actuator 110 and the second actuator 120 may constitute the actuator assembly 100 by coupling the first frame 112 and the second frame 122 to each other. Here, the first frame 112 and the second frame 122 may have the same size. Meanwhile, when the actuator assembly 100 is implemented such that one glass is tilted in the first direction and the second direction, it is necessary to form the second frame 122 outside the first frame 112 or form the first frame 112 outside the second frame 122. That is, the first frame 112 and the second frame 122 may have different sizes. In this case, since a size in the first and second directions of the actuator assembly 100 is increased, the problems described with reference to FIG. 3 may occur.

As in embodiments of the present disclosure, when the first actuator 110 including the first glass 111 tilted in the first direction is coupled with the second actuator 120 including the second glass 121 tilted in the second direction, only a forward and backward thickness of the actuator assembly 100 may be increased, but the size in the first and second directions thereof may not be increased. Therefore, it is possible to prevent an increase in a size of the projector 1, thereby implementing a compact projector supporting high resolution.

Hereinafter, a video projecting operation of the projector 1 including the actuator assembly 100 according to embodiments of the present disclosure will be described with reference to FIGS. 9 to 14.

Figure 9:
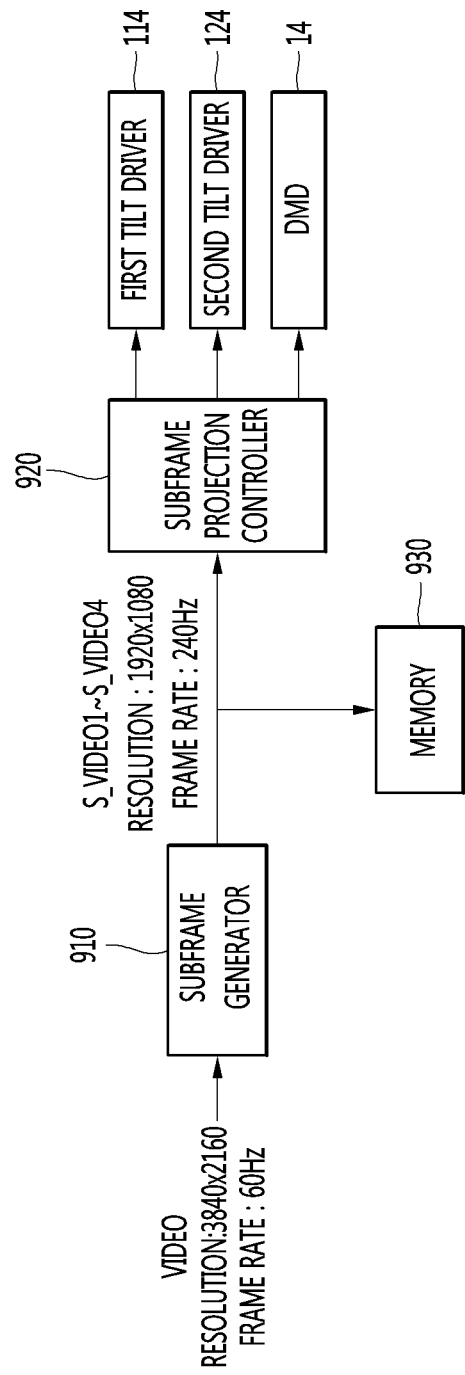
FIG. 9 is a schematic block diagram illustrating control components related to a video projecting operation of a projector, according to embodiments of the present disclosure.

FIG. 9 is a schematic block diagram illustrating control components related to the video projecting operation of the projector 1, according to embodiments of the present disclosure.

A subframe generator 910 and the subframe projection controller 920 shown in FIG. 9 may be implemented as at least one processor. The at least one processor may be implemented as hardware such as an application specific integrated circuit (ASIC), a field programmable gate array (FPGA), a CPU, a microcomputer, or an application processor (AP).

Referring to FIG. 9, resolution of a video VIDEO input in the projector 1 may be first resolution (for example, UHD resolution of 3840×2160), and a frame rate of the video VIDEO may be a first frame rate (for example, about 60 Hz).

The subframe generator 910 included in the projector 1 may generate a plurality of subframe videos, i.e., first to fourth subframe videos S_VIDEO1 to S_VIDEO4 from the input video VIDEO.

The subframe generator 910 may divide each frame of the video VIDEO into a plurality of subframes based on a ratio between the first resolution of the video VIDEO and second resolution of the DMD 14. For example, when the first resolution is four times the second resolution, the subframe generator 910 may divide each frame of the video VIDEO into four subframes and may generate the first to fourth subframe videos S_VIDEO1 to S_VIDEO4 each including one of the four subframes. That is, a first frame of the video VIDEO may be divided into first subframes of the first to fourth subframe videos S_VIDEO1 to S_VIDEO4. As a result, a total frame rate of the first to fourth subframe videos S_VIDEO1 to S_VIDEO4 may be set to a second frame rate corresponding to the product (240 Hz) of the first frame rate (60 Hz) and the number (4) of the subframe videos.

According to embodiments, the generated first to fourth subframe videos S_VIDEO1 to S_VIDEO4 may be stored in a memory 930. The memory 930 may be a kind of buffer, but is not necessarily limited thereto. The memory 930 may be a storage device in the projector 1.

The subframe projection controller 920 may control the first tilt driver (first coil 114), the second tilt driver (second coil 124), and the DMD 14 to project the video VIDEO onto a screen by using the first to fourth subframe videos S_VIDEO1 to S_VIDEO4 generated by the subframe generator 910. Although not shown, the subframe projection controller 920 may control the light source 10, the color wheel 12, and the like together.

Specifically, the subframe projection controller 920 may sequentially project respective frames of the first to fourth subframe videos S_VIDEO1 to S_VIDEO4. That is, in order to project the first frame of the video VIDEO onto the screen, the subframe projection controller 920 may control the DMD 14 to sequentially project the first subframes of the first to fourth subframe videos S_VIDEO1 to S_VIDEO4. When the first to fourth subframe videos S_VIDEO1 to S_VIDEO4 are projected, the subframe projection controller 920 may control current supply to each of the first coil 114 of the first tilt driver and the second coil 124 of the second tilt driver such that the first to fourth subframe videos S_VIDEO1 to S_VIDEO4 are projected at different optical angles. The subframe projection controller 920 may control the DMD 14, the first tilt driver (first coil 114), and the second tilt driver (second coil 124) based on the total frame rate of the first to fourth subframe videos S_VIDEO1 to S_VIDEO4.

Hereinafter, operations of the first and second actuators 110 and 120 according to control of the subframe projection controller 920, and videos projected according to the operations will be described in more detail with reference to FIGS. 10 to 13.

FIGS. 10 to 13 are views respectively illustrating video projecting operations according to driving of the tilt drivers included in the actuator assembly 100, according to embodiments of the present disclosure.

Figure 10:
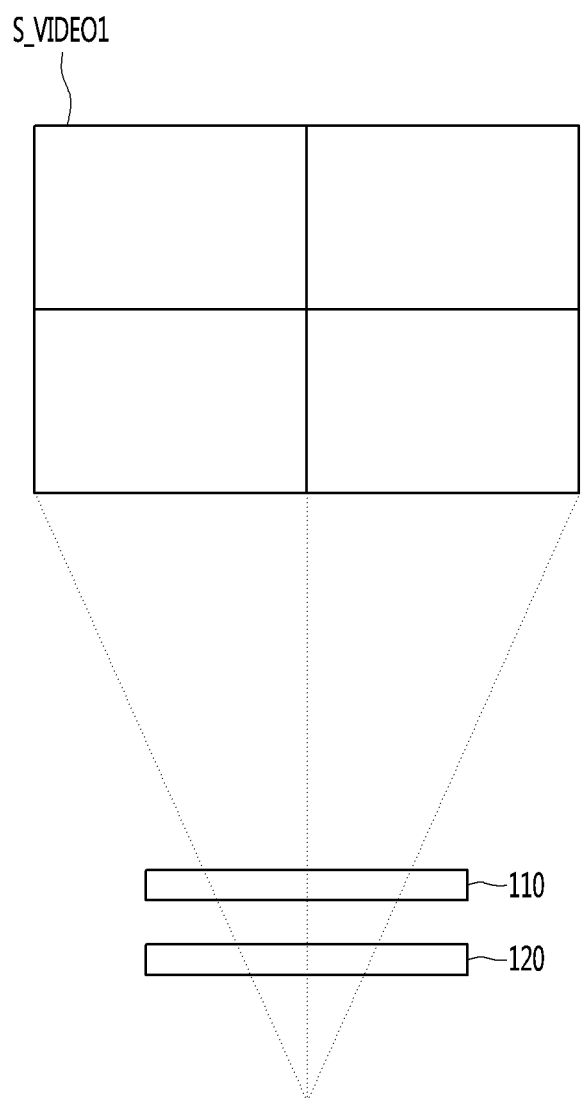
FIGS. 10 to 13 are views respectively illustrating video projecting operations according to driving of tilt drivers included in an actuator assembly, according to embodiments of the present disclosure.

Referring to FIG. 10, the subframe projection controller 920 may control the DMD 14 to project the first subframe video S_VIDEO1. Here, the subframe projection controller 920 may control the first tilt driver (for example, the first coil 114) and the second tilt driver (for example, the second coil 124) to project the first subframe video S_VIDEO1 at a first optical angle.

When the subframe projection controller 920 controls the DMD 14 to project the first subframe video S_VIDEO1, first light reflected by the DMD 14 may correspond to the first subframe video S_VIDEO1. The first light may not be refracted by the actuator assembly 100 and may be projected onto the screen through the projection lens 30 to display the first subframe video S_VIDEO1. That is, the first glass 111 and the second glass 121 may not be tilted and may be placed at a reference position (or a reference angle). When the first glass 111 and the second glass 121 are placed at the reference position, the first glass 111 and the second glass 121 may be parallel to each other. The subframe projection controller 920 may control current supply to each of the first coil 114 and the second coil 124 such that the first glass 111 and the second glass 121 are placed at the reference position. For example, the subframe projection controller 920 may not supply a current to the first coil 114 and the second coil 124 to place the first coil 114 and the second coil 124 at the reference position.

Figure 11:
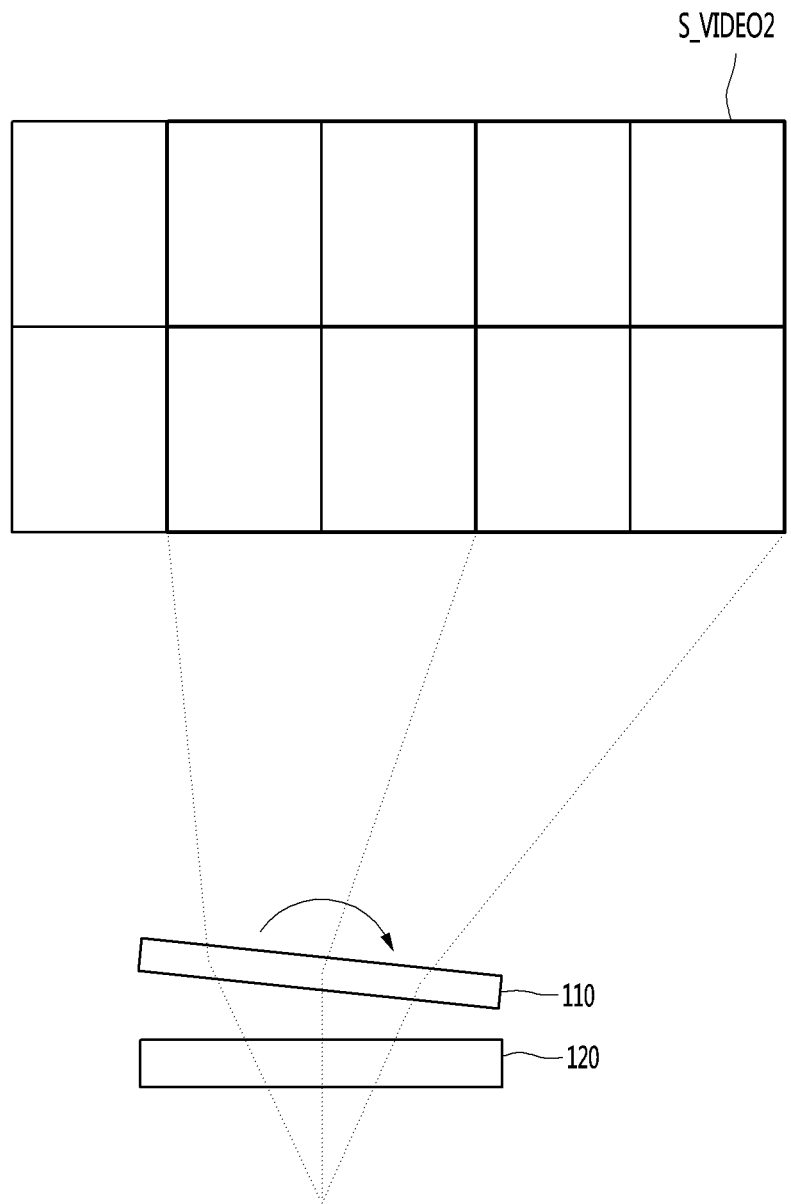

Referring to FIG. 11, the subframe projection controller 920 may control the DMD 14 to project the second subframe video S_VIDEO2. Here, the subframe projection controller 920 may control the first tilt driver (for example, the first coil 114) and the second tilt driver (for example, the second coil 124) to project the second subframe video S_VIDEO2 at a second optical angle.

When the subframe projection controller 920 controls the DMD 14 to project the second subframe video S_VIDEO2, second light reflected by the DMD 14 may correspond to the second subframe video S_VIDEO2. The second light may be refracted at the second optical angle by the first glass 111 of the first actuator 110 and may be projected onto the screen through the projection lens 30 to display the second subframe video S_VIDEO2.

That is, the second glass 121 may not be tilted and may be placed at a reference position (or a reference angle), and the first glass 111 may be tilted at a certain angle (for example, about 0.3°) in a first direction (for example, a right direction when viewed from above). The subframe projection controller 920 may control current supply to the first coil 114 such that the first glass 111 is tilted in the first direction. For example, the subframe projection controller 920 may supply a current to the first coil 114 to tilt the first glass 111 and may not supply current to the second coil 124 to place the second glass 121 at the reference position.

Therefore, the second subframe video S_VIDEO2 displayed on the screen may be shifted in the second direction (right direction), as compared to the first subframe video S_VIDEO1.

Figure 12:
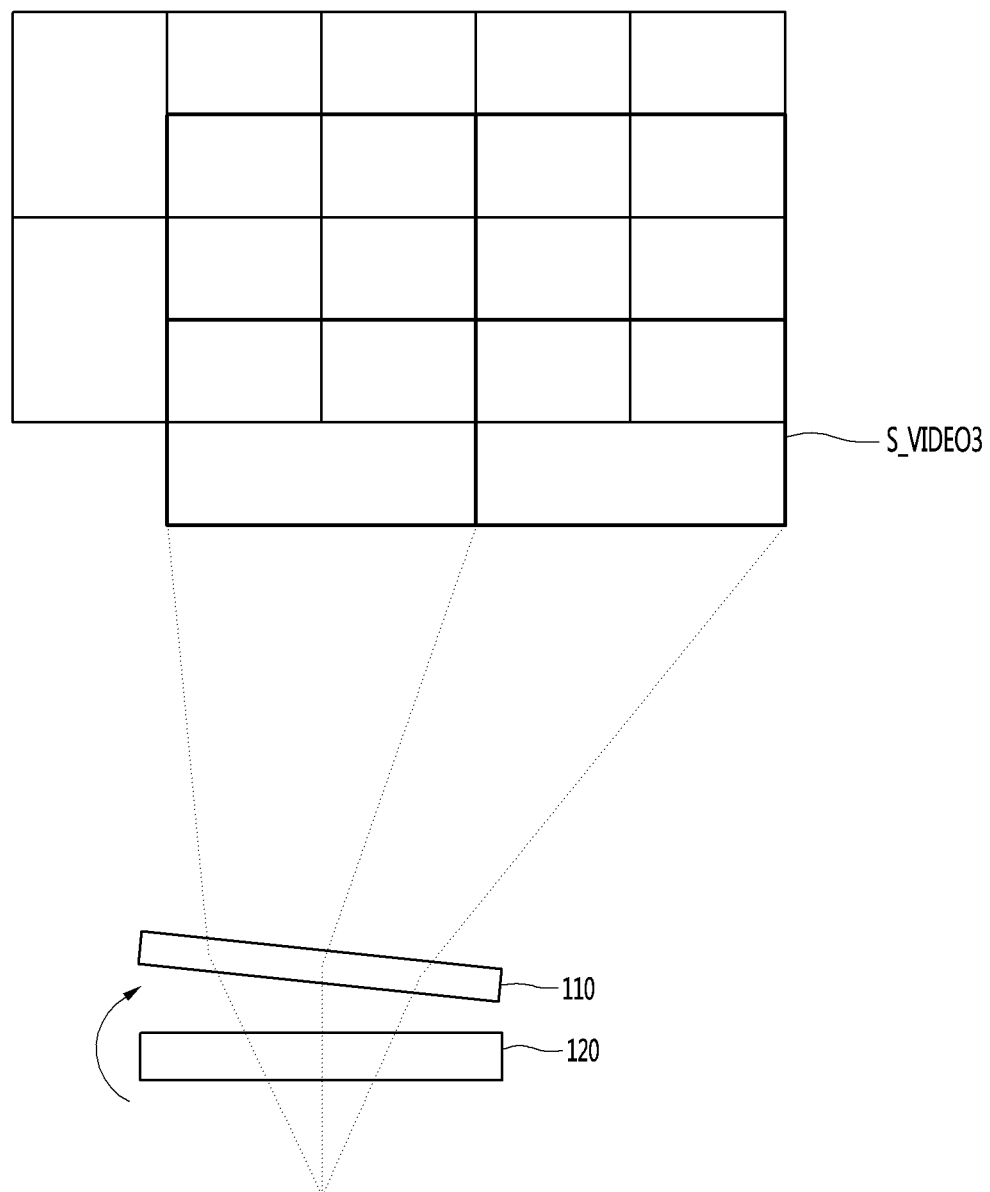

Referring to FIG. 12, the subframe projection controller 920 may control the DMD 14 to project the third subframe video S_VIDEO3. Here, the subframe projection controller 920 may control the first tilt driver (for example, the first coil 114) and the second tilt driver (for example, the second coil 124) to project the third subframe video S_VIDEO3 at a third optical angle.

When the subframe projection controller 920 controls the DMD 14 to project the third subframe video S_VIDEO3, third light reflected by the DMD 14 may correspond to the third subframe video S_VIDEO3. The third light may be refracted at the third optical angle by the first glass 111 of the first actuator 110 and the second glass 121 of the second actuator 120 and may be projected onto the screen through the projection lens 30 to display the third subframe video S_VIDEO3.

That is, the first glass 111 may be tilted at a certain angle (for example, about 0.3°) in the first direction, and the second glass 121 may be tilted at a certain angle (for example, about 0.3°) in a second direction (for example, a lower direction when viewed from above). The subframe projection controller 920 may control current supply to the first coil 114 such that the first glass 111 is tilted at a certain angle in the first direction and control current supply to the second coil 124 such that the second glass 121 is tilted at a certain angle in the second direction. For example, the subframe projection controller 920 may supply a current to the first coil 114 to tilt the first glass 111 in the first direction (right direction) and supply current to the second coil 124 to tilt the second glass 121 at the second direction (lower direction).

Therefore, the third subframe video S_VIDEO3 displayed on the screen may be shifted in the second direction (lower direction), as compared to the second subframe video S_VIDEO2.

Figure 13:
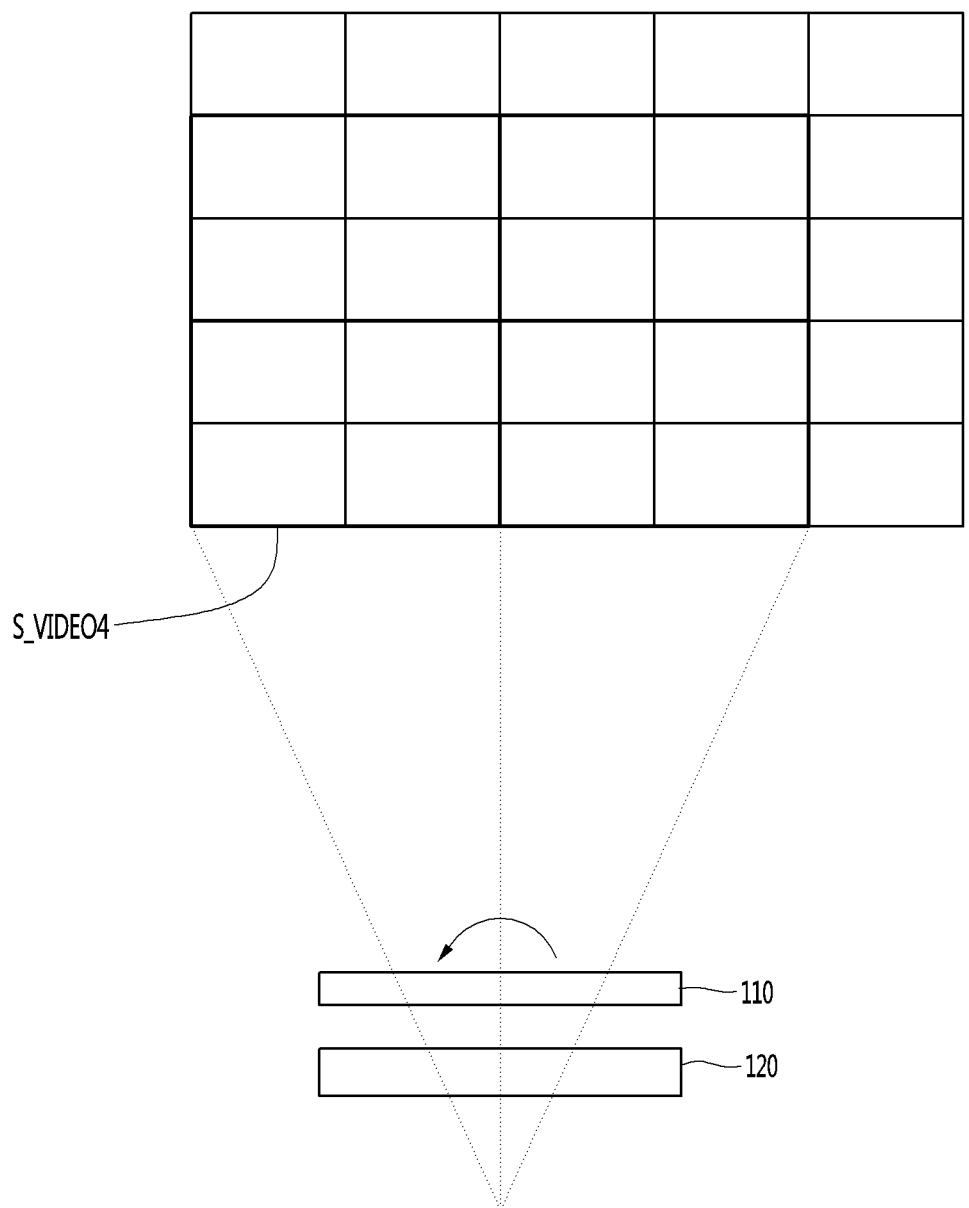

Referring to FIG. 13, the subframe projection controller 920 may control the DMD 14 to project the fourth subframe video S_VIDEO4. Here, the subframe projection controller 920 may control the first tilt driver (for example, the first coil 114) and the second tilt driver (for example, the second coil 124) to project the fourth subframe video S_VIDEO4 at a fourth optical angle.

When the subframe projection controller 920 controls the DMD 14 to project the fourth subframe video S_VIDEO4, fourth light reflected by the DMD 14 may correspond to the fourth subframe video S_VIDEO4. The fourth light may be refracted at the fourth optical angle by the second glass 121 of the second actuator 120 and may be projected onto the screen through the projection lens 30 to display the fourth subframe video S_VIDEO4.

That is, the first glass 111 may return to a reference position (or a reference angle) and may not be tilted, and the second glass 121 may be tilted at a certain angle (for example, about 0.3°) in the second direction. The subframe projection controller 920 may control current supply to the second coil 124 such that the second glass 121 is tilted at a certain angle in the second direction. For example, the subframe projection controller 920 may supply a current to the second coil 124 to tilt the second glass 121 and may not supply current to the first coil 114 to place the first glass 111 at the reference position.

Therefore, the fourth subframe video S_VIDEO4 displayed on the screen may be shifted in the second direction (lower direction), as compared to the first subframe video S_VIDEO1.

Meanwhile, the total frame rate of the first to fourth subframe videos S_VIDEO1 to S_VIDEO4 may be four times the frame rate of the input video VIDEO of FIG. 9. That is, when the frame rate of the video VIDEO is about 60 Hz, the total frame rate of the first to fourth subframe videos S_VIDEO1 to S_VIDEO4 may be about 240 Hz. That is, the subframe projection controller 920 may control the DMD 14, the first tilt driver (first coil 114), and the second tilt driver (second coil 124) at a rate of about 240 times per second. Therefore, even when the first to fourth subframe videos S_VIDEO1 to S_VIDEO4 are sequentially displayed on the screen, a naked eye of a user may recognize the first to fourth subframe videos S_VIDEO1 to S_VIDEO4 as one video having a frame rate of about 60 Hz.

FIG. 14 is a view illustrating videos displayed according to results of the video projecting operations according to the embodiments shown in FIGS. 10 to 13.

Referring to FIG. 4, when only the first subframe video S_VIDEO1 is displayed on the screen, only one piece of pixel data P1 may be displayed in a first region R1 of the screen.

On the contrary, when the first to fourth subframe videos S_VIDEO1 to S_VIDEO4 are sequentially displayed on the screen, the pixel data P1 of the first subframe video S-VIDEO1, pixel data P2 of the second subframe video S-VIDEO2, pixel data P3 of the third subframe video S-VIDEO3, and pixel data P4 of the fourth subframe video S-VIDEO4 may be displayed in the first region R1 of the screen.

That is, even when resolution of the input video VIDEO is higher than resolution of the DMD 14, the projector 1 may sequentially shift and display a plurality of subframe videos divided from the input video VIDEO by using the actuator assembly 100 according to embodiments of the present disclosure, thereby providing a video having the same quality and the same frame rate as the input video VIDEO to a user.

According to various embodiments of the present disclosure, in order to project content having resolution higher than resolution supportable by a DMD by refracting light projected from the DMD, a projector may include an actuator assembly having two glasses respectively tilted in first and second directions perpendicular to each other. Therefore, since a tilted angle is accurately controllable, as compared to a case where one glass is tilted in the first and second directions, content may be more stably projected onto a screen.

In addition, the assembly actuator included in the projector according to embodiments of the present disclosure may be implemented in a small size, as compared to a structure in which one glass is tilted in the first and second directions, thereby miniaturizing a projector supporting high resolution.

As can be seen from the foregoing, the projector is not limited to the configurations and methods of the embodiments described above, but all or some components of the embodiments may be configured to be selectively combined such that various modifications can be made thereto.

What is claimed is:

1. A projector comprising:
   a light source configured to provide light;
   a digital micromirror device configured to form a video by selectively reflecting the light;
   a projection lens configured to enlarge and project the light reflected by the digital micromirror device onto a screen; and
   an actuator assembly disposed between the digital micromirror device and the projection lens and configured to allow the light incident on the projection lens from the digital micromirror device to travel straight or be refracted,
   wherein the actuator assembly comprises:
   a first actuator comprising a first glass and a first tilt driver tilting the first glass in a first direction; and
   a second actuator comprising a second glass and a second tilt driver tilting the second glass in a second direction,
   wherein the first glass and the second glass are spaced apart from each other by a distance such that:
   a contact between the first glass and the second glass is prevented when at least one of the first glass or the second glass is tilted; and
   an electromagnetic effect between the first tilt driver and the second tilt driver is prevented.

2. The projector according to claim 1, wherein the first glass is tilted in the first direction, and the second glass is tilted in the second direction perpendicular to the first direction.

3. The projector according to claim 2, wherein the first actuator further comprises:
   a first frame disposed outside the first glass and fixed in a housing of the projector;
   a first rotational shaft extending from the first glass in the second direction, connected to the first frame, and fixing the first glass to the first frame such that the first glass is tilted.

4. The projector according to claim 3, wherein the second actuator further comprises:
   a second frame disposed outside the second glass and fixed in the housing of the projector;
   a second rotational shaft extending from the second glass in the first direction, connected to the second frame, and fixing the second glass to the second frame such that the second glass is tilted.

5. The projector according to claim 4, wherein the first frame and the second frame have the same size.

6. The projector according to claim 4, wherein the first frame and the second frame are coupled such that one surface of the first glass and one surface of the second glass face each other.

7. The projector according to claim 4, wherein the first tilt driver comprises a first coil fixed to the first frame and a first magnetic body fixed to the first glass, and
   the second tilt driver comprises a second coil fixed to the second frame and a second magnetic body fixed to the second glass.

8. The projector according to claim 4, further comprising a subframe generator configured to generate a plurality of subframe videos from a video input to the projector based on first resolution of the video and second resolution of the digital micromirror device, and
   a subframe projection controller configured to control the digital micromirror device to sequentially project the plurality of subframe videos and control the first tilt driver and the second tilt driver such that the plurality of subframe videos are projected at different optical angles.

9. The projector according to claim 8, wherein the subframe generator divides each frame of the video into a plurality of subframes based on a ratio between the first resolution and the second resolution, and generates the plurality of subframe videos comprising the plurality of subframes, wherein resolution of each of the plurality of subframe videos is the second resolution.

10. The projector according to claim 8, wherein a total frame rate of the plurality of subframe videos is the product of a frame rate of the input video and the number of the plurality of subframe videos.

11. The projector according to claim 8, further comprising a memory configured to store the plurality of subframe videos.

12. An operating method of a projector, the operating method comprising:

generating a plurality of subframe videos from an input video;

controlling a digital micromirror device of the projector to sequentially project frames of the plurality of subframe videos; and controlling an actuator assembly of the projector to project the plurality of subframe videos at different optical angles, wherein the actuator assembly comprises:

a first actuator comprising a first glass and a first tilt driver tilting the first glass in a first direction; and a second actuator comprising a second glass and a second tilt driver tilting the second glass in a second direction perpendicular to the first direction, wherein the controlling of the actuator assembly comprises controlling the first glass and the second glass such that at least one of the first glass and the second glass is tilted or is not tilted when each of the plurality of subframe videos is projected, and wherein the first glass and the second glass are spaced apart from each other by a distance such that:

a contact between the first glass and the second glass is prevented when at least one of the first glass or the second glass is tilted; and an electromagnetic effect between the first tilt driver and the second tilt driver is prevented.

13. The operating method according to claim 12, wherein the generating of the plurality of subframe videos comprises generating the plurality of subframe videos based on first resolution of the input video and second resolution of the digital micromirror device, and resolution of each of the plurality of subframe videos is the second resolution.

14. The operating method according to claim 12, wherein the controlling of the actuator assembly comprises controlling current supply to a first coil included in the first tilt driver and a second coil included in the second tilt driver such that at least one of the first glass or the second glass is tilted or is not tilted when each of the plurality of subframe videos is projected.

* * * * *